United States Patent [19]
Biddle

[11] 3,941,151
[45] Mar. 2, 1976

[54] VENT PIPE CHECK VALVE

[76] Inventor: Joseph R. Biddle, 8605 Harry Hines Blvd., Dallas, Tex. 75235

[22] Filed: Oct. 7, 1974

[21] Appl. No.: 512,522

[52] U.S. Cl. .......... 137/527.6; 137/527.8; 251/147; 251/306; 4/211
[51] Int. Cl.² .................................. F16K 15/00
[58] Field of Search............ 137/527, 527.2, 527.4, 137/527.6, 527.8, 550; 251/305, 306, 337, 338, 147; 4/211

[56] References Cited
UNITED STATES PATENTS

| | | | |
|---|---|---|---|
| 215,887 | 5/1879 | Crossman | 137/527.8 |
| 813,771 | 2/1906 | Bush | 251/306 X |
| 1,337,326 | 4/1920 | Rice | 137/527.8 |
| 1,993,069 | 3/1935 | McConnell, Jr. | 251/305 X |
| 2,008,835 | 7/1935 | Rawcliffe | 251/147 |
| 2,461,392 | 2/1949 | Parry | 4/211 X |
| 2,494,016 | 1/1950 | Taylor | 137/527.6 X |
| 2,760,517 | 8/1956 | Davis | 137/527.8 |
| 3,605,132 | 9/1971 | Lineback | 4/211 |

Primary Examiner—William R. Cline
Attorney, Agent, or Firm—Peter J. Murphy

[57] ABSTRACT

A valve assembly clamped to the upper end of a vent pipe includes an elongated sleeve with a band clamp and sealing gasket at its inner end for ready clamping to the vent pipe. A butterfly valve plate is nonrotatably fixed to a pivot shaft in unbalanced relation, with the shaft extending through the sleeve and having a transverse operator arm. Semi-annular seat means provide a sealing seat at upper and lower surfaces of the valve plate, on respective opposite sides of the pivot axis; and a spring or weight urges the valve plate to the seated position.

9 Claims, 5 Drawing Figures

VENT PIPE CHECK VALVE

BACKGROUND AND SUMMARY OF THE INVENTION

This invention relates to a check valve assembly for closing the upper end of a vent pipe to prevent the escape of pollutant gas, and more particularly to such a valve assembly which is automatic in operation.

A principal object of this invention is to provide a means for controlling the venting of the plumbing system, in residences or other structures, which will prevent the venting of sewer gas along with its inherent objectionable odor and undesirable pollutants into the atmosphere, and which will eliminate the necessity for expensive and unsightly vent pipes which project upwardly from the roofs of residences or other building structures.

Another object of this invention is to provide a relatively inexpensive and effective check valve assembly which can be readily mounted to the upper end of a vent pipe in a structure, preferably in the attic spaces of such structure, or in any other suitable location, and which will perform the desired venting function for the plumbing system.

A further object of this invention is to provide a valve assembly which will act automatically to maintain the vent pipe closed to prevent venting of undesirable gases and fumes to the atmosphere, and which will automatically allow fresh air from the atmosphere to enter the plumbing system each time a suction or vacuum is created in the system when liquids are flushed through the waste pipes following use of connected plumbing fixtures.

Still another object of this invention is to provide such a valve assembly of simple construction enabling economic manufacture, and yet which is effective for the intended purpose.

These objects are accomplished in a valve assembly which includes an elongated thin walled cylindrical sleeve dimensioned to be clamped over the end of a vent pipe, and having longitudinal slots opening to said inner end to allow diameter variation. A resilient annular gasket, dimensioned for a snug fit within the sleeve slotted end, provides a seal between the sleeve and pipe. A valve plate is mounted on a transverse pivot shaft, with a major portion of the plate disposed on one side of the shaft and a minor portion disposed on the other side; and the pivot shaft is mounted transversely of the sleeve intermediate its ends and offset from the sleeve axis. Seat means mounted on the sleeve define a seating plane in which the valve plate closes the sleeve, with the seat means being disposed to permit inward swinging of the plate major portion and outward swinging of the plate minor portion. Means coupled to the valve plate urges rotation into the seating plane.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 1:
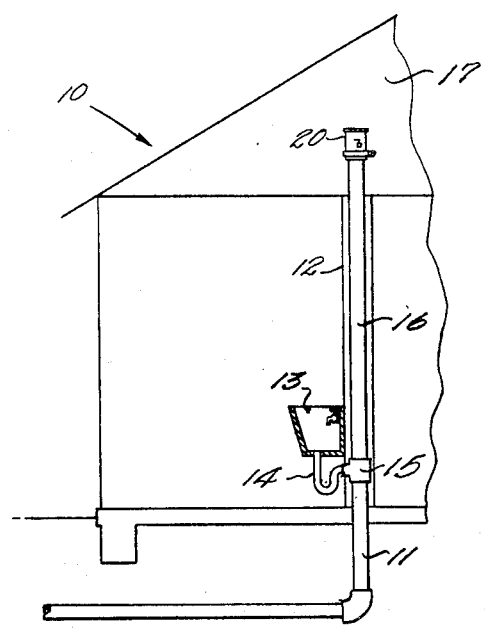
FIG. 1 is a fragmentary diagrammatic view of a building plumbing system including a sink, a waste pipe, a vent pipe and a vent check valve assembly according to the invention.

FIG. 1 of the drawing is a fragmentary diagrammatic view of the building structure 10, such as a residence, wherein a portion of the plumbing system includes a downward and laterally extending waste pipe 11 with the vertical portion being partially confined within an interior partition 12; and with a catch basin or sink 13 mounted on that partition and having a drain pipe 14 connected to the waste pipe by means of a tee 15. A vent pipe 16 extends upwardly from the tee within the partition 12 into the attic space 17; and a check valve assembly 20 is secured to the upper end of the vent pipe in the attic space. The vent pipe 16 is conventional, being fabricated of cast iron or PVC plastic for example, and may be of nominal 2 ½ inch, 3 inch, or 4 inch size for example.

Figure 2:
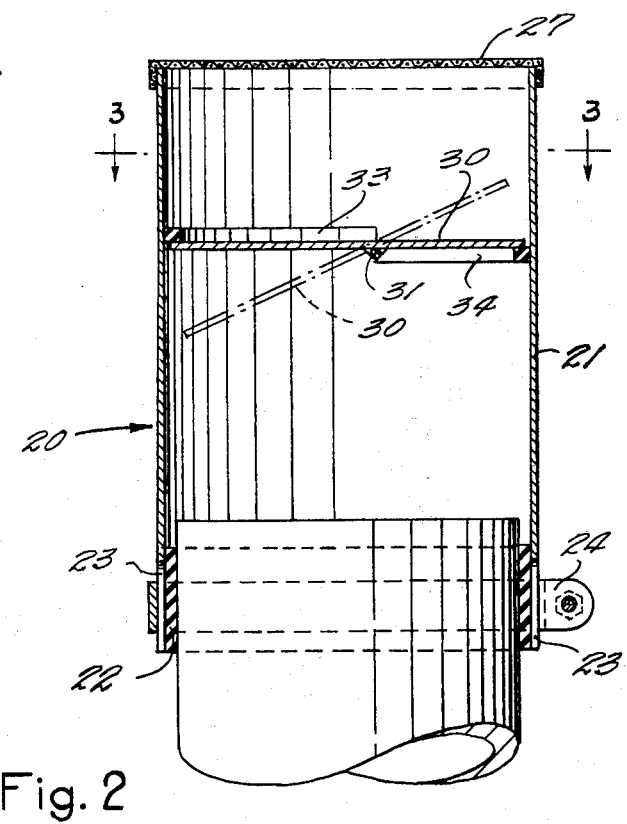
FIG. 2 is a longitudinal sectional view of the check valve assembly attached to a vent pipe.
Figure 3:
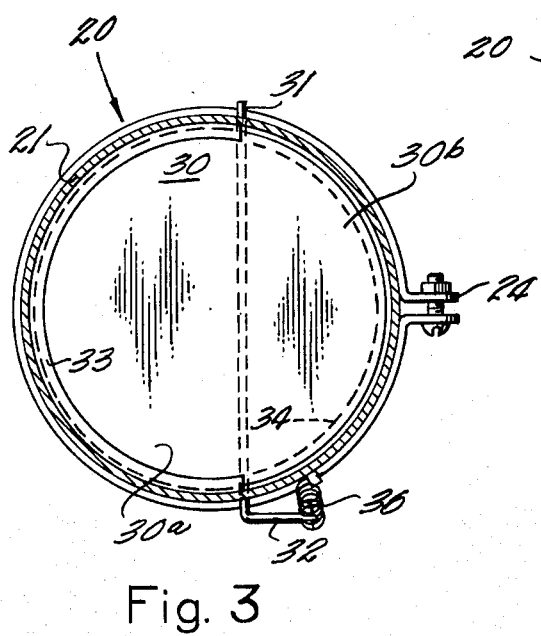
FIG. 3 is a transverse sectional view taken in the plane 3—3 of FIG. 2.
Figure 4:
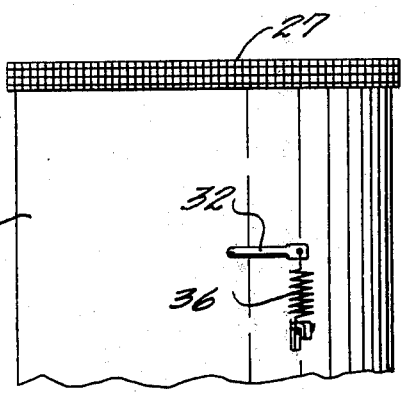
FIG. 4 is a fragmentary elevation view of the check valve assembly of FIGS. 2 and 3.

FIGS. 2, 3 and 4 illustrate a preferred form of check valve assembly according to the invention in which the base member is an elongated, thin walled, cylindrical sleeve 21 of uniform cross-section, fabricated from a suitable noncorrosive material such as aluminum or plastic. These sleeves will be made of a diameter slightly larger than the vent pipe with which they are to be coupled, to enable coupling to the vent pipe in overlapping telescoping relation with an intervening annular seal such as a cylindrical gasket 22 of neoprene or similar material. The sleeve may have a length of 10 inches for example. The sleeve is provided with peripherally spaced longitudinal slots 23 opening to one end, referred to as the inner end, to permit some contraction or expansion of the sleeve at the inner end, and an adjustable band clamp 24 is associated at its inner end for clamping the sleeve onto the vent pipe. As best seen in FIG. 2 the gasket 22 is axially elongated to overlie the slots 23 and prevent leakage between the valve assembly and pipe.

The valve structure, sometimes referred to as a butterfly valve, includes, in the illustrated form, a circular thin-walled valve plate 30 of a suitable noncorrosive metal or plastic which is nonrotatably mounted on a pivot shaft 31, with a major portion or area 30a of the valve plate being disposed on one side of the pivot shaft and a minor portion 30b being disposed on the opposite side of the shaft. The pivot shaft, as best seen in FIG. 3, extends through the sleeve walls at both sides of the sleeve, and is offset at least slightly from the central longitudinal axis of the sleeve. Seat means mounted on the sleeve 21 define, in the illustrated form, a seating plane which is perpendicular to the sleeve axis; however it will be understood that the seating plane is not necessarily perpendicular but may be inclined. The seating means, as illustrated, consists of semi-annular strips of a resilient rubber-like material such as neoprene which are secured to the inner wall of the sleeve in any suitable manner. The seating strips define the seating plane, and include one semi-annular strip 33 which is engaged by the outer surface of the valve plate major portion permitting inward swinging thereof, and a corresponding semi-annular strip 34 which is engaged by the inner surface of the plate minor portion permitting outward swinging of this portion.

As best seen in FIGS. 3 and 4, the pivot shaft 31 is formed to define a transverse operator arm 32 at one end, exteriorly of the sleeve; and a tension spring 36 is coupled between the distal end of this arm and the sleeve to normally urge rotation of the arm, shaft and valve plate in a direction to seat the plate 30 in the seating plane.

The outer end of the sleeve 21 is capped with a suitable screen cap 27, fabricated of a suitable noncorrosive material such as aluminum or copper screen, and secured to the sleeve in any suitable manner to prevent the entry of foreign materials which might interfere with the proper operation of the valve. This screen is particularly desirable when the valve assembly 20 is in the illustrated vertical orientation; however it will be understood that the valve assembly could function as well if oriented horizontally, which may be desired in some installations.

Figure 5:
FIG. 5 is a fragmentary elevation view similar to FIG. 4 of an alternative form of vent check valve assembly.

FIG. 5 of the drawing illustrates a slightly modified form of check valve assembly 40 which is identical in all respects to the assembly 20 described above with the exception that the tension spring 36 is omitted. In this assembly a suitable weight 41 is coupled to the distal end of the pivot shaft operator arm 32, which weight acts to urge rotation of the pivot shaft in a direction to place the valve plate in the seating plane. With this configuration, obviously the direction of the operator arm 32 relative to the pivot shaft would have to be oriented properly in relation to the orientation of the valve assembly.

In operation, the valve plate 30 is normally maintained in the seating plane, seated against the seating strips 33 and 34 by means of the biasing spring 36 or the weight 41. When a reduced pressure or suction is created within the vent pipe 16, resulting from the flushing of liquid from the sink 13 or other plumbing fixture, the valve plate will rotate away from the seating plane as illustrated by the broken lines in FIG. 2 moving against the force of the spring or weight. The valve opening force results from the differential pressure acting across the unbalanced valve plate; and the open valve plate allows flow of ambient air into the vent pipe.

What has been described is a simple, effective and economical check valve assembly for attachment to a sewer system vent pipe for preventing the venting of undesirable pollutants and gases to the atmosphere, and for effecting the removal of such gases back to the sewer system.

While preferred embodiments of the invention have been illustrated and described, it will be understood by those skilled in the art that changes and modifications may be resorted to without departing from the spirit and scope of the invention.

What is claimed is:
1. A vent pipe check valve assembly comprising
an elongated, thin-walled, cylindrical sleeve dimensioned to be clamped over the end of a vent pipe; said sleeve having longitudinal slots opening to its inner end to allow diameter variation at said inner end;
a resilient annular gasket dimensioned for a snug fit within said sleeve slotted end, to provide a seal between said sleeve and a vent pipe;
a thin-walled valve plate mounted on a transverse pivot shaft, with a major portion disposed on one side of said shaft and a minor portion disposed on the other side thereof; said pivot shaft being mounted transversely in said sleeve intermediate its ends, offset from the sleeve axis;
seat means comprising resilient strip members mounted on the inner wall of said sleeve defining a seating plane in which said valve plate substantially closes said sleeve; said seat means comprising a first generally semi-annular member secured to the sleeve wall, for limiting outward swinging of the valve plate major portion, and a second generally semi-annular member secured to the sleeve wall, for limiting inward swinging of the valve plate minor portion;
and means coupled to said valve plate for urging rotation thereof into said seating plane.
2. A check valve assembly as set forth in claim 1 said valve plate being nonrotatably mounted on said pivot shaft; said pivot shaft extending through at least one wall of said sleeve; and said rotation urging means being coupled to said shaft at the exterior of said sleeve.
3. A check valve assembly as set forth in claim 2 said rotation urging means comprising a spring coupled between said shaft and the exterior of said sleeve.
4. A check valve assembly as set forth in claim 3 said pivot shaft including an exterior operator arm; and a tension spring coupled between said sleeve and said operator arm.
5. A check valve assembly as set forth in claim 2 said pivot shaft including an exterior operator arm; and said rotation urging means comprising a weight coupled to said operator arm effective to urge rotation of said valve plate into said seating plane.
6. A check valve assembly as set forth in claim 1 a screen cap secured to the outer end of said sleeve.
7. A check valve assembly as set forth in claim 1 clamp means associated with said sleeve for clamping said sleeve and gasket in sealing relation with a vent pipe.
8. A check valve assembly as set forth in claim 7 said annular gasket extending axially to overlie said slots; and said clamp means being an annular clamp enclosing the slotted end of said sleeve.
9. A check valve assembly as set forth in claim 1 said sleeve having a uniform cross-section throughout its length.

* * * * *